(12) United States Patent
Smith et al.

(10) Patent No.: US 7,889,733 B2
(45) Date of Patent: Feb. 15, 2011

(54) INTELLIGENT ADJUNCT NETWORK DEVICE

(75) Inventors: Michael R. Smith, Morgan Hill, CA (US); Douglas Alan Gourlay, Sausalito, CA (US); Jeffrey Y M Wang, Saratoga, CA (US); Ali Golshan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1148 days.

(21) Appl. No.: 10/833,377

(22) Filed: Apr. 28, 2004

(65) Prior Publication Data

US 2005/0243826 A1   Nov. 3, 2005

(51) Int. Cl.
*H04L 12/28* (2006.01)

(52) U.S. Cl. .................................. 370/392; 370/395.31

(58) Field of Classification Search ........................ None
See application file for complete search history.

(56) References Cited

U.S. PATENT DOCUMENTS

| | | | |
|---|---|---|---|
| 4,387,371 A | 6/1983 | Beker et al. | 340/825.52 |
| 5,058,110 A | 10/1991 | Beach et al. | 370/464 |
| 5,371,852 A | 12/1994 | Attanasio et al. | 709/245 |
| 5,473,599 A | 12/1995 | Li et al. | 370/16 |
| 5,679,277 A | 10/1997 | Niibe et al. | 219/543 |
| 5,801,914 A | 9/1998 | Thrash | 361/104 |
| 5,822,512 A | 10/1998 | Goodrum et al. | 714/13 |
| 5,824,996 A | 10/1998 | Kochman et al. | 219/529 |
| 5,825,772 A | 10/1998 | Dobbins et al. | 370/396 |
| 5,851,588 A | 12/1998 | Uthoff, Jr. | 427/228 |
| 5,861,610 A | 1/1999 | Weiss | 219/497 |
| 5,872,783 A | 2/1999 | Chin | 370/395.32 |
| 5,959,968 A | 9/1999 | Chin et al. | 370/216 |
| 5,959,972 A | 9/1999 | Hamami | 370/228 |
| 5,959,989 A | 9/1999 | Gleeson et al. | 370/390 |
| 5,961,869 A | 10/1999 | Irgens | 219/549 |
| 5,978,852 A * | 11/1999 | Myrick et al. | 709/238 |
| 6,031,214 A | 2/2000 | Bost et al. | 219/545 |

(Continued)

FOREIGN PATENT DOCUMENTS

CN    1407762 A    4/2003

(Continued)

OTHER PUBLICATIONS

Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification (including claims & abstract); and 11 sheets of drawings.

(Continued)

*Primary Examiner*—Jayanti K Patel
*Assistant Examiner*—Anthony Sol
(74) *Attorney, Agent, or Firm*—Campbell Stephenson LLP

(57) ABSTRACT

An adjunct network device includes several ports, an uplink interface, and an adjunct forwarding engine coupled to the ports and the uplink interface. A first port is configured to receive a packet, which includes a destination address. The adjunct forwarding engine is configured to send the packet to the uplink interface if the destination address is not associated with any of the ports. The packet is sent to one of the ports if the destination address is associated with the one of the ports.

22 Claims, 7 Drawing Sheets

U.S. PATENT DOCUMENTS

| | | | |
|---|---|---|---|
| 6,032,194 A | 2/2000 | Gai et al. | 709/239 |
| 6,054,690 A | 4/2000 | Petit et al. | 219/528 |
| 6,064,671 A | 5/2000 | Killian | 370/389 |
| 6,085,238 A * | 7/2000 | Yuasa et al. | 709/223 |
| 6,108,300 A | 8/2000 | Coile et al. | 370/217 |
| 6,163,543 A | 12/2000 | Chin et al. | 370/400 |
| 6,181,681 B1 | 1/2001 | Hiscock et al. | 370/279 |
| 6,181,699 B1 | 1/2001 | Crinion et al. | 370/392 |
| 6,195,351 B1 | 2/2001 | Hiscock et al. | 370/389 |
| 6,202,114 B1 | 3/2001 | Dutt et al. | 710/311 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,275,953 B1 | 8/2001 | Vahalia et al. | 714/11 |
| 6,298,061 B1 | 10/2001 | Chin et al. | 370/400 |
| 6,377,992 B1 | 4/2002 | Fernandez et al. | 709/227 |
| 6,388,995 B1 | 5/2002 | Gai et al. | 370/256 |
| 6,421,787 B1 | 7/2002 | Slaughter et al. | 714/4 |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Gai et al. | 370/256 |
| 6,567,403 B1 | 5/2003 | Congdon et al. | 370/389 |
| 6,570,845 B1 | 5/2003 | Blanc et al. | 370/218 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,678,241 B1 | 1/2004 | Gai et al. | 370/216 |
| 6,687,758 B2 | 2/2004 | Craft et al. | 709/250 |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1 | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2 | 10/2004 | Wils et al. | 709/230 |
| 6,810,421 B1 * | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,915,340 B2 | 7/2005 | Tanaka | 709/120 |
| 6,938,095 B2 | 8/2005 | Basturk et al. | 709/238 |
| 6,941,487 B1 | 9/2005 | Balakrishnan et al. | 714/4 |
| 6,980,534 B1 | 12/2005 | Nee et al. | 370/329 |
| 7,042,855 B1 * | 5/2006 | Gilchrist et al. | 370/328 |
| 7,061,858 B1 | 6/2006 | Di Benedetto et al. | 370/219 |
| 7,061,875 B1 | 6/2006 | Portolani et al. | 370/256 |
| 7,126,923 B1 | 10/2006 | Yang et al. | 370/256 |
| 7,127,633 B1 | 10/2006 | Olson et al. | 714/4 |
| 7,130,305 B2 | 10/2006 | Kuukankorpi et al. | 370/392 |
| 7,178,052 B2 | 2/2007 | Hebbar et al. | 714/4 |
| 7,251,217 B2 | 7/2007 | Wong et al. | 370/232 |
| 7,286,853 B2 | 10/2007 | Meier | 455/560 |
| 7,502,865 B2 | 3/2009 | Seto | 709/238 |
| 7,672,228 B1 | 3/2010 | Senevirathne et al. | 370/219 |
| 2001/0014097 A1 | 8/2001 | Beck et al. | 370/401 |
| 2002/0016874 A1 | 2/2002 | Watanuki et al. | 710/51 |
| 2002/0018489 A1 | 2/2002 | Ambe et al. | 370/401 |
| 2002/0073338 A1 * | 6/2002 | Burrows et al. | 713/201 |
| 2002/0080720 A1 | 6/2002 | Pegrum et al. | 370/236 |
| 2002/0087716 A1 | 7/2002 | Mustafa | 709/236 |
| 2002/0089978 A1 | 7/2002 | Wang et al. | 370/445 |
| 2002/0091755 A1 | 7/2002 | Narin | 709/203 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong et al. | 370/401 |
| 2002/0184387 A1 | 12/2002 | Yamaya et al. | 709/238 |
| 2002/0186654 A1 | 12/2002 | Tornar | 370/225 |
| 2002/0188711 A1 | 12/2002 | Meyer et al. | 709/224 |
| 2003/0007489 A1 | 1/2003 | Krishnan et al. | 370/469 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 * | 6/2003 | Szczepanek et al. | 711/100 |
| 2003/0142680 A1 | 7/2003 | Oguchi | 370/400 |
| 2003/0152101 A1 * | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0198231 A1 | 10/2003 | Kalkunte et al. | 370/395.31 |
| 2004/0057469 A1 | 3/2004 | Nuss et al. | 370/535 |
| 2004/0066781 A1 * | 4/2004 | Shankar et al. | 370/389 |
| 2004/0078621 A1 | 4/2004 | Talaugon et al. | 714/4 |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0179507 A1 | 9/2004 | Batra et al. | 370/343 |
| 2004/0208116 A1 | 10/2004 | Saint Etienne et al. | 370/216 |
| 2005/0036488 A1 * | 2/2005 | Kalkunte et al. | 370/389 |
| 2005/0041665 A1 | 2/2005 | Weyman et al. | 370/390 |
| 2005/0044186 A1 * | 2/2005 | Petrisor | 709/219 |
| 2005/0063395 A1 | 3/2005 | Smith et al. | 370/399 |
| 2005/0083933 A1 | 4/2005 | Fine et al. | 370/390 |
| 2005/0089014 A1 * | 4/2005 | Levin et al. | 370/351 |
| 2005/0111483 A1 | 5/2005 | Cripe et al. | 370/463 |
| 2005/0169311 A1 | 8/2005 | Millet et al. | 370/471 |
| 2005/0193114 A1 * | 9/2005 | Colby et al. | 709/226 |
| 2005/0198371 A1 | 9/2005 | Smith et al. | 709/238 |
| 2005/0259646 A1 | 11/2005 | Smith et al. | 370/389 |
| 2005/0265346 A1 | 12/2005 | Ho et al. | 370/392 |
| 2006/0015643 A1 * | 1/2006 | Orava et al. | 709/238 |
| 2006/0215679 A1 | 9/2006 | Musoll et al. | 370/412 |
| 2007/0159971 A1 | 7/2007 | Zhang et al. | 370/230 |
| 2007/0180266 A1 | 8/2007 | Kang et al. | 713/189 |
| 2009/0080431 A1 * | 3/2009 | Rekhter | 370/392 |
| 2009/0134996 A1 | 5/2009 | White et al. | 340/538 |

FOREIGN PATENT DOCUMENTS

| | | |
|---|---|---|
| EP | 1 035 685 | 9/2000 |
| EP | 1 309 135 A1 | 5/2003 |
| EP | 1 401 147 | 3/2004 |
| GB | 2 362 538 | 5/2000 |
| WO | WO 00/72531 | 11/2000 |
| WO | WO 00/78004 | 12/2000 |
| WO | WO 02/01413 | 5/2001 |
| WO | WO 02/18965 | 3/2002 |
| WO | WO 03/081451 | 10/2003 |

OTHER PUBLICATIONS

Michael R. Smith, Jeffrey YM Wang, Ali Golshan; "Interface Bundles in Virtual Network Devices;" U.S. Appl. No. 10/782,314, filed Feb. 19, 2004; 42 pages of Specification (including claims & abstract); and 13 sheets of drawings.

Knight, S. et al. Virtual Router Redundancy Protocol, IETF, Apr. 1998, 27 pages.

International Search Report dated Aug. 2, 2005, from related International Application No. PCT/US2004/029554, 6 pages.

Written Opinion of the International Searching Authority dated Aug. 2, 2005 from related International Application No. PCT/US2004/029554, 5 pages.

International Search Report dated Jan. 14, 2005 from corresponding International Application No. PCT/US2004/029553, 4 pages.

Written Opinion of the International Searching Authority dated Jan. 14, 2005 from corresponding International Application No. PCT/US2004/029553, 6 pages.

CIPO Examination Report in related Canadian Patent Application No. 2,534,511 dated May, 1, 2006, 4 pages.

Cisco Systems, Inc.: Copyright 1989-1997, http://www.cisco.com/univercd/cc/td/doc/product/rtrmgmt/sw_ntman/cwsimain/cwsi2/cwsiug2/vlan2/stpapp.htm; "Understanding Spanning-Tree Protocol," Appendix C, pp. C-1 through C-12.

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

D.T. Stott, "Layer-2 Path Discovery Using Spanning Tree MIBs", Avaya Labs Research, Avaya, Inc., Mar. 7, 2002, pp. 1-23.

International Search Report as mailed from the PCT on Mar. 18, 2005, for International Application No. PCT/US2004/034851, 2 pages.

Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm "Understanding Spanning-Tree Protocol," Appendix C, pp. C-1 through C-12.

News Release: "Cisco Raises the Bar in Stackable Switching, Introduces Catalyst 3750 Series with Cisco StackWise™ Technology;" 3 pages; http://newsroom.cisco.com/dlls/prod_041503b.html, Apr. 15, 2003.

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003, see AJ), Nov. 2006.

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Michael Ward; "802.1S Solves Architecture Issues;" *Network World*, Aug. 4, 2003; 3 pages; http://www.n_wfusion.com/cgi-bin/mailto/x.cgi.

Nortel Networks, "Split Multi-link Trunking," http://www.nortelnetworks.com/corporate/technology/smlt/, pp. 1-2 (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

* cited by examiner

INTELLIGENT ADJUNCT NETWORK DEVICE

BACKGROUND OF THE INVENTION

1. Field of the Invention

The present invention relates to networking and, more particularly, to decreasing the number of points of management within a network.

2. Description of the Related Art

In order to provide increased network reliability, redundant switches and links are often included in a network. If a switch or link fails, a redundant switch or link, already in place within the network, can quickly be enabled to replace the failed switch or link. Since the redundant switch or link can typically be enabled as a replacement more quickly than the failed component can be replaced or repaired, having redundant links and/or switching can provide a more reliable network.

When redundant components are included within a network, it is often desirable to be able to use the redundant components during normal network operation, before the failure of corresponding components. For example, if two links are implemented between a pair of switches, it is desirable to use both links (as opposed to leaving one link idle) to provide increased bandwidth. However, if multiple redundant links are active at the same time, management of those links may be undesirably complicated (e.g., due to the need to avoid bridging loops). Similarly, if additional network devices are included within a network for redundancy purposes, the management of those network devices can become overly complicated. For example, if configuration changes need to be applied to a class of network devices, service personnel will need to apply the changes to all of the network devices in that class. If the number of network devices is doubled in order to provide increased redundancy, the amount of service personnel effort needed to apply the changes will be doubled. Accordingly, it is desirable to be able to include redundant components in a network without undesirably increasing the expense of managing and maintaining the network.

SUMMARY OF THE INVENTION

Various embodiments of methods and systems for implementing intelligent adjunct network devices are disclosed. An intelligent adjunct network device includes one or more adjunct forwarding engines, each of which is used to perform local forwarding and/or routing, one or more ports, which are used to communicate with locally-attached network clients and/or servers, and one or more uplink interfaces, which are used to communicate with one or more network devices. The intelligent adjunct network device receives configuration information from the network device(s) via the uplink interface. The intelligent adjunct network device also forwards packets that cannot be forwarded locally, or that the intelligent adjunct does not know how to forward, to the network device(s) via the uplink interface.

A method, which is performed by an adjunct network device, involves receiving a packet via a first port of several ports. The packet includes a destination address. If the destination address does not correspond to any of the ports, the packet is sent to an uplink interface. If the destination address does correspond to one of the ports, the packet is sent to that one of the ports. Program instructions executable to perform such a method can be stored on a computer readable medium.

The method can involve downloading routing information to a forwarding engine via the uplink interface. Such a method can also involve sending an error notification to the uplink interface in response to detecting a conflict between local forwarding information and forwarding information received via the uplink interface. In one embodiment, the error notification includes the correct value of the forwarding information.

If a packet is sent to the uplink interface, information associated with the packet can also be sent to the uplink interface. This information identifies the port via which the packet is received. The information can also include a destination identifier generated by performing a lookup for the destination address.

In one embodiment, the uplink interface is coupled to a link within a virtual link bundle. In such a system, if a packet, sent via the uplink interface, is received at a virtual network device, the virtual network device will not be allowed to send the packet via the virtual link bundle.

In some embodiments, an adjunct network device includes several ports, an uplink interface, and an adjunct forwarding engine coupled to the ports and the uplink interface. A first port is configured to receive a packet, which includes a destination address. The adjunct forwarding engine is configured to send the packet to the uplink interface if the destination address is not associated with any of the ports. The packet is sent to one of the ports if the destination address is associated with the one of the ports.

The adjunct network device can also include a controller configured to append a header to the packet before the packet is sent to the uplink interface. The header includes information identifying the first port. The header can also include a destination identifier generated by performing a lookup for the destination address.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
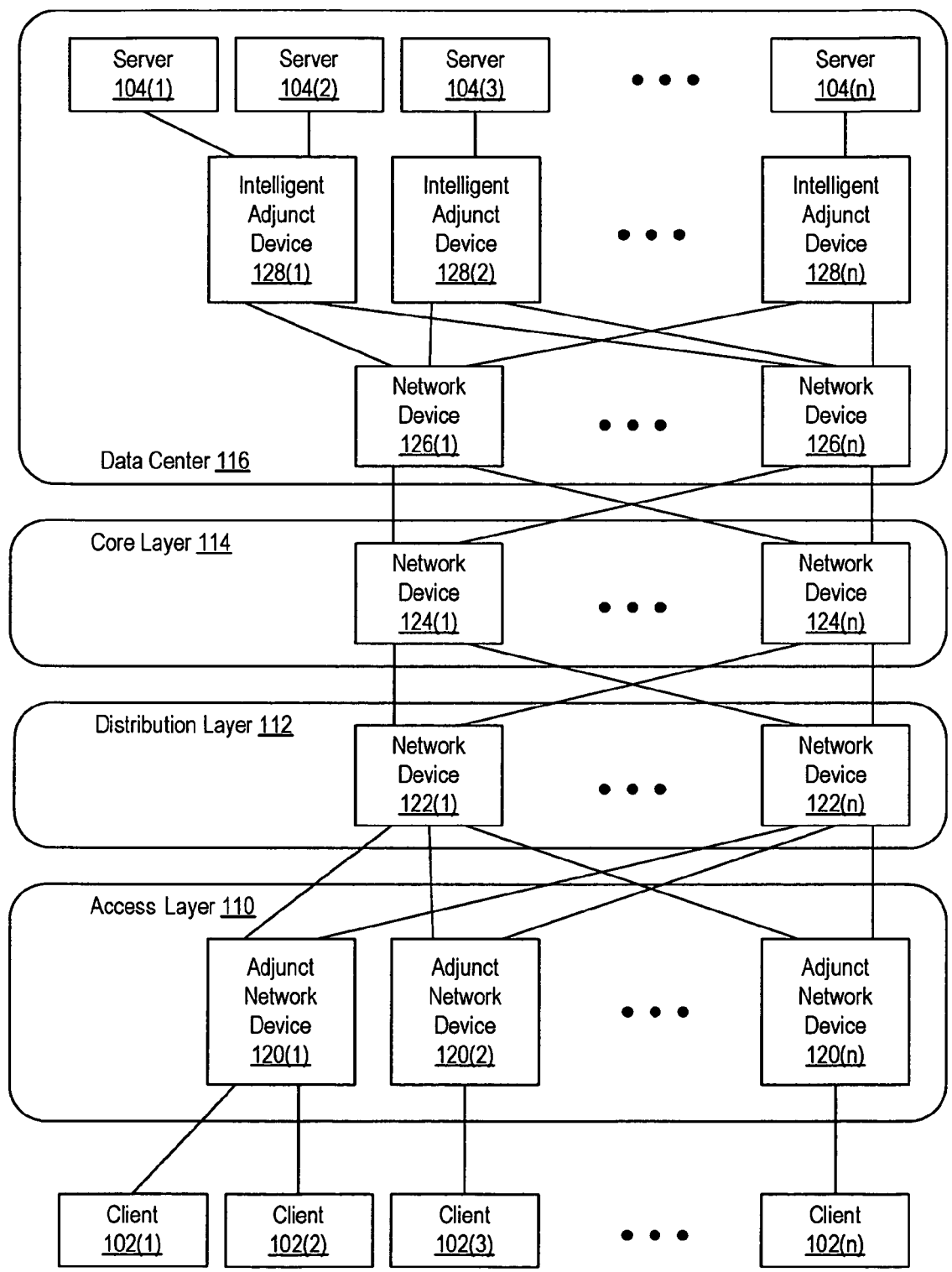
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a network that includes several intelligent adjunct devices. In FIG. 1, several clients 102(1)-102(n) communicate with each other and with several servers 104(1)-104(n) via a network. Clients 102(1)-102(n) can include a variety of different devices that access networked services. For example, client 102(1) can be a cell phone, client 102(2) can be a personal computer, and client 102(n) can be a Personal Digital Assistant (PDA). Servers 104(1)-104(n) provide various services, such as various software-based services and/or access to shared storage devices.

The network coupling clients 102(1)-102(n) and servers 104(1)-104(n) is described in terms of several network layers. The layer closest to clients 102(1)-102(n) is access layer 110. Access layer 110 includes several adjunct network devices 120(1)-120(n). In this example, access layer 110 is the primary layer at which packets enter the network from clients 102(1)-102(n).

Distribution layer 112 aggregates flows received via access layer 110 and provides these aggregated flows to core layer 114. In this example, distribution layer 112 includes network devices 122(1)-122(n). Core layer 114 is a logically centralized portion of the network through which various aggregated flows pass. Core layer 114 includes network devices 124(1)-124(n).

In this example, data center 116 includes two sets of network devices: network devices 126(1)-126(n) and intelligent adjunct network devices 128(1)-128(n). Intelligent adjunct network devices 128(1)-128(n) provide access to the network to various servers 104(1)-104(n). Network devices 126(1)-126(n) aggregate flows from intelligent adjunct network devices 128(1)-128(n) and provide the aggregated flows to core layer 114.

It is noted that in some embodiments, networks will not include the network layers illustrated in FIG. 1 (e.g., some of the layers can be combined and/or eliminated, and alternative layers can also be included in addition to and/or instead of those shown in FIG. 1). Additionally, clients and servers can be coupled to the network differently than shown in FIG. 1 (e.g., some clients and/or servers can be coupled to individual network devices in the core and/or distribution layers). Additionally, the physical locations of devices relative to each other can differ from the logical locations shown in FIG. 1. For example, two devices in the same network layer can be physically located on different floors, in different buildings, or on different campuses. In contrast, two devices in different network layers can be located in the same room.

Adjunct network devices 120(1)-120(n), intelligent adjunct devices 128(1)-128(n), and network devices 122(1)-122(n), 124(1)-124(n), and 126(1)-126(n) can include various routers, switches, gateways, and other network equipment. In many embodiments, only one network device, intelligent adjunct network device, or adjunct network device may be needed at each layer in order for the network to function. However, multiple such devices can be included at each layer, as shown in FIG. 1, in order to provide redundancy and/or to provide additional bandwidth.

Multiple links can be implemented between devices in different network layers to provide additional redundancy. For example, as shown in FIG. 1, each adjunct network device 120(1)-120(n) in access layer 110 is coupled to distribution layer 112 by two (or more) different links. Similarly, each network device 122(1)-122(n) in distribution layer 112 is coupled to core layer 114 by two (or more) different links. Each intelligent adjunct network device 128(1)-128(n) in data center 116 is coupled to network devices 126(1)-126(n) in data center 116 by two (or more) different links. In one embodiment, each link is an Ethernet link.

Adjunct network devices 120(1)-120(n) and intelligent adjunct network devices 128(1)-128(n), respectively included in access layer 110 and data center 116, operate differently than network devices 122(1)-122(n), 124(1)-124(n), and 126(1)-126(n). Non-adjunct network devices coupled to adjunct network devices control the operation of the adjunct network devices. For example, network devices 126(1)-126(n) can configure intelligent adjunct network devices 128(1)-128(n) according to various routing protocols and perform control protocol processing for intelligent adjunct network devices 128(1)-128(n). Similarly, network devices 122(1)-122(n) can configure adjunct network devices 120(1)-120(n). As shown in FIG. 1, the controlling network devices are located in inner network layers (i.e., layers that are closer to the core layer than adjunct and intelligent adjunct devices) relative to the adjunct and intelligent adjunct network devices, which are located at the edge layers of the network (i.e., the layers that provide direct access to clients and servers).

By allowing adjunct and intelligent adjunct network devices to be controlled by other network devices, the number of points of management within the network is reduced. For example, if an upgrade needs to be applied to each network device within the network of FIG. 1, a technician can manually upgrade each network device that controls adjunct network device. For example, the technician can upgrade each network device 126(1)-126(n) in data center 116. These network devices can then automatically apply the upgrade (e.g., by sending updated forwarding table values) to the intelligent adjunct network devices 128(1)-128(n) controlled by network devices 126(1)-126(n). Thus, instead of having to manually upgrade each network device 126(1)-126(n) and each intelligent adjunct network device 128(1)-128(n), the technician can simply upgrade network devices 126(1)-126(n) and allow those network devices to automatically distribute the upgrades to adjunct network devices 128(1)-128(n).

In order to make remote management of adjunct network devices 120(1)-120(n) less complex, adjunct network devices 120(1)-120(n) are implemented without any decision-making capability (e.g., forwarding and/or routing capabilities) with regard to how packets are conveyed through the network. Since adjunct network devices 120(1)-120(n) lack local decision-making capabilities, adjunct network devices 120(1)-120(n) operate by simply sending any packets received from clients 102(1)-102(n) to network devices 122(1)-122(n). Network devices 122(1)-122(n) then decide (e.g., by forwarding and/or routing the packets) how to convey the packets through the network. This configuration performs well in access layer 110, where most traffic received by a given adjunct network device is not addressed to another device attached to the given adjunct network device. In contrast, network traffic within data center 116 tends to be switched locally. For example, a significant amount of traffic entering intelligent adjunct network device 128(1) from locally attached servers (or clients, not shown) will be addressed to other locally attached servers or clients (as opposed to being addressed to devices attached to other network devices). In order to be able to handle this type of traffic without needing assistance from network devices 126(1)-126(n), intelligent adjunct network devices 128(1)-128(n) have decision-making capabilities (e.g., forwarding and/or routing capabilities).

Figure 2A:
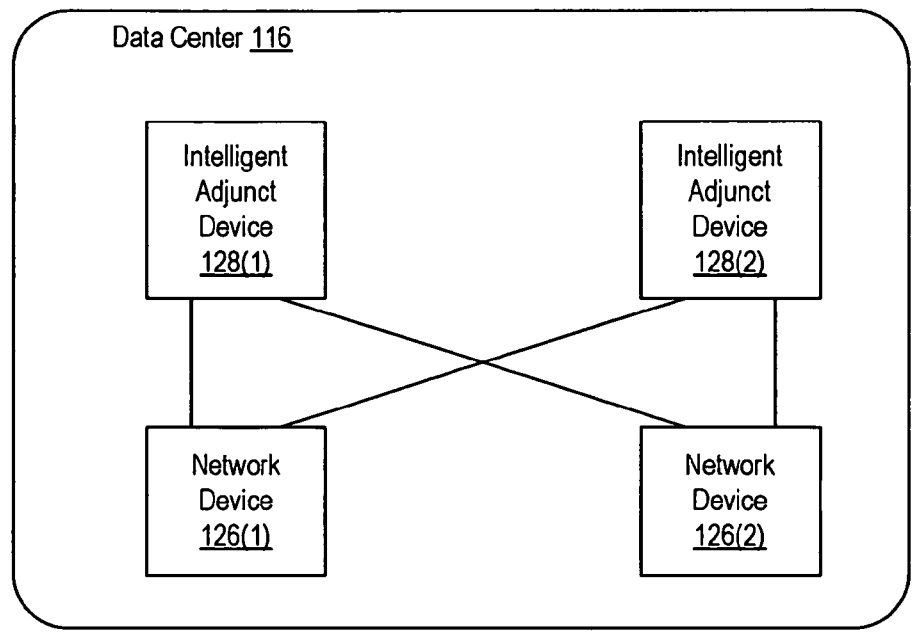
FIG. 2A illustrates how intelligent adjunct network devices can be coupled to other network devices, according to one embodiment of the present invention.

FIG. 2A illustrates how two intelligent adjunct network devices 128(1) and 128(2) can be coupled to network devices 126(1) and 126(2) in data center 116. In this example, network devices 126(1) and 126(2) provide redundant functionality within the network. Each intelligent adjunct network device 128(1) and 128(2) has redundant connections to network devices 126(1)-126(2). As shown, each intelligent adjunct network device 128(1) and 128(2) can be configured with at least one connection to each network device 126(1) and 126(2). This way, if one of the links between an intelligent adjunct network device and network devices 126(1) and 126(2) fail, or if one of network devices 126(1) and 126(2) fails, the intelligent adjunct network device will still be able to communicate with the rest of the network.

Figure 2B:
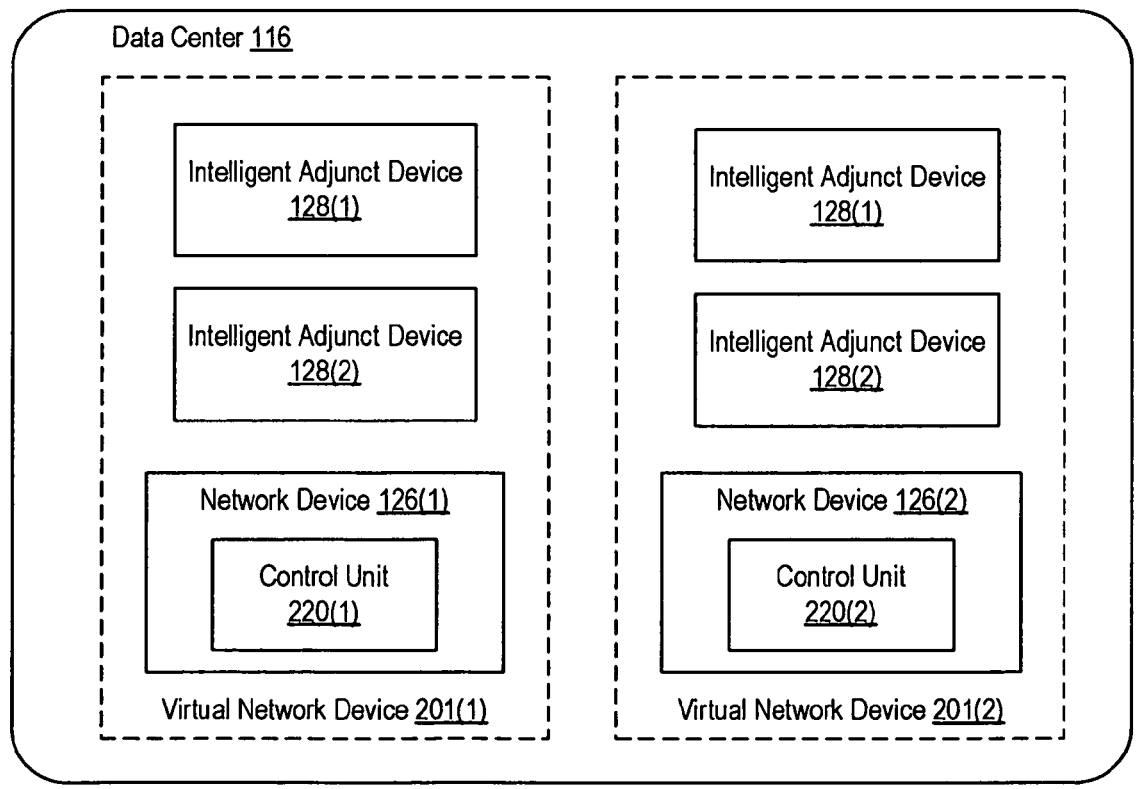
FIG. 2B illustrates how intelligent adjunct network devices can be operated as virtual line cards, according to one embodiment of the present invention.

FIG. 2B illustrates how intelligent adjunct network devices can be operated as virtual line cards. Here, network devices 126(1)-126(2) operate intelligent adjunct network devices 128(1)-128(2) as if intelligent adjunct network devices 128(1)-128(2) were line cards of network devices 126(1)-126(2), despite the fact that intelligent adjunct network devices 128(1)-128(2) can actually be implemented in physically separate hardware from network devices 126(1)-126(2).

As shown, network device 126(1) can operate at least a portion of each intelligent adjunct network device 128(1) and 128(2) as a virtual line card of network device 126(1). Control unit 220(1) within network device 126(1) can assign port identifiers to each port within the portion of each intelligent adjunct network device. Control unit 220(1) can also perform control protocol processing and generate routing information for use by intelligent adjunct network devices 128(1) and 128(2).

When an intelligent adjunct network device sends a packet to network device 126(1), the intelligent adjunct network device can associate information with that packet. For example, the intelligent adjunct network device can append a header containing the information to the packet. The header can include the port identifier, assigned by control unit 220(1), of the port of the intelligent adjunct network device that originally received the packet. Network device 126(1) can use the header to determine the location of the device that sent the packet relative to the intelligent adjunct network device's ports. Network device 126(1) can then forward subsequently received packets that are addressed to that device to the appropriate port of the intelligent adjunct network device. For example, if a packet is addressed to that device, network device 126(1) can append a header identifying the appropriate port of the intelligent adjunct network device to the packet and send the packet and the header to the intelligent adjunct network device. The intelligent adjunct network device can then perform a local forwarding table lookup and send the packet via the port identified in the header appended to the packet.

Network device 126(2) can similarly operate at least a portion of each intelligent adjunct network device as a virtual line card. For example, control unit 220(2) of network device 126(2) can configure one or more ports in each intelligent adjunct network device. Control unit 220(2) can also perform control protocol processing and generate routing information for use by intelligent adjunct network devices 128(1) and 128(2) when forwarding packets via those ports. In one embodiment, each network device 126(1) and 126(2) controls a unique subset of the ports within each intelligent adjunct network device. In other embodiments, network devices 126(1)-126(2) coordinate with each other in order to collectively control the same ports within each intelligent adjunct network device. Network devices, such as network devices 126(1) and 126(2), that control intelligent adjunct network devices are referred to as controlling network devices.

Figure 3A:
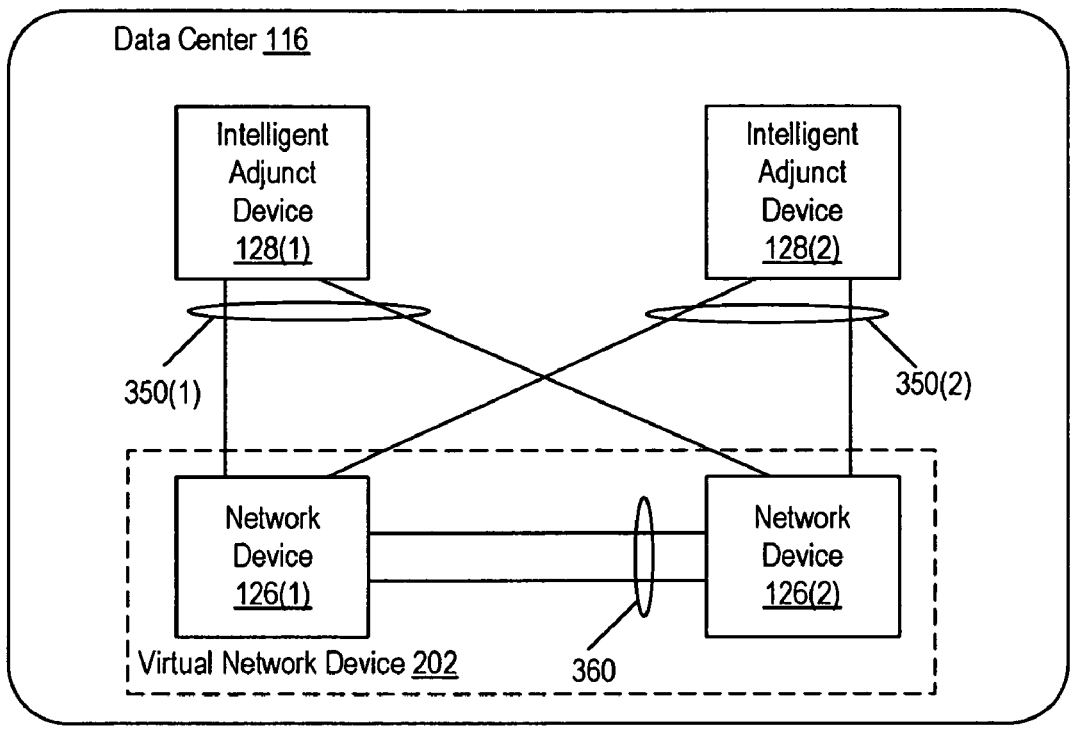
FIGS. 3A-3C show how two network devices can operate as a single virtual network device, according to one embodiment of the present invention.

Within each network layer, multiple redundant network devices can be configured to collectively operate as a single virtual network device. FIG. 3A illustrates an embodiment in which network devices 126(1) and 126(2) coordinate with each other in order to implement virtual network device 202. In the illustrated example, network devices 126(1) and 126(2) are coupled by a pair of redundant links 360, referred to as virtual network device link 360. It is noted that fewer or additional links can be used to implement virtual network device link 360 in other embodiments. It is noted that in other embodiments, virtual network device 202 can include more than two component network devices.

Each intelligent adjunct network device 128(1)-128(2) is coupled to virtual network device 202 by two links (different numbers of links are used in other embodiments). In this example, each of those two links is coupled to a different one of network devices 126(1) and 126(2). The redundant links coupling each of intelligent adjunct network devices 128(1) and 128(2) to virtual network device 202 can be operated as a single logical link, referred to herein as a virtual link bundle. For example, intelligent adjunct network device 128(1) operates the two links coupling that intelligent adjunct network device to virtual network device 202 as a virtual link bundle 350(1). In such an embodiment, each interface in intelligent adjunct network device 128(1) that is coupled to one of the links is included in an interface bundle for the corresponding virtual link bundle. Intelligent adjunct network device 128(2) similarly operates the two links coupling intelligent adjunct network device 128(2) to virtual network device 202 as virtual link bundle 350(2). In some embodiments, virtual link bundles 350(1) and 350(2) are each operated as an EtherChannel™ or as an aggregated link, as defined in IEEE 802.3. In other embodiments, each link in each virtual link bundle is operated independently of each other link in that virtual link bundle (as opposed to being operated as part of a single logical link).

The links in virtual link bundles 350(1) and 350(2) are specialized links, referred to herein as uplinks. Similarly, an interface within a network device 126(1) or 126(2) or intelligent adjunct network device 128(1) or 128(2) that is coupled to an uplink is referred to herein as an uplink interface. Each uplink is capable of conveying both a packet and additional information generated within one of the network devices. For example, if a packet is being conveyed on an uplink from one of intelligent adjunct network devices 128(1) or 128(2) to one of network devices 126(1) or 126(2), additional information conveyed on the uplink with the packet can include information identifying which of the adjunct network device's ports received the packet. The additional information can also include information indicating whether any decision-making (e.g., forwarding or routing) has already been performed for the packet by the sending device. In some embodiments, use of uplinks allows network devices 126(1) and 126(2) to operate intelligent adjunct network devices 128(1) and 128(2) as virtual line cards. The use of uplinks can also allow network devices 126(1)-126(2) to be able to perform decision-making (e.g., routing and/or forwarding) on packets for intelligent adjunct network devices 128(1) and 128(2) in certain situations.

In one embodiment, two interface bundles are coupled to each virtual link bundle. One of these interface bundles is located within a single intelligent adjunct network device while the other interface bundle spans multiple network devices at the controlling network device level. For example, virtual link bundle 350(1) is coupled to two uplink interfaces within intelligent adjunct network device 128(1). Virtual link bundle 350(1) is also coupled to an interface bundle that includes one uplink interface in network device 126(1) and one uplink interface in network device 126(2).

Network devices 126(1) and 126(2) can coordinate certain behaviors when sending packets via virtual link bundles 350(1) and 350(2) in order to act as a virtual network device 202 that, from the perspective of intelligent adjunct network devices 128(1)-128(2), appears to be a single logical network device. For example, whenever network device unit 126(2) receives a packet from one of the intelligent adjunct network devices and that packet's destination address is located behind uplink interface bundle 350(2), network device unit 126(2) sends the packet from the local uplink interface within the identified uplink interface bundle. Network device unit 126(2) can also provide a copy of the packet to network device unit 126(1), but network device unit 126(1) will not output this packet via its local uplink interface within the identified uplink interface bundle. This way, an intelligent adjunct device only receives one copy of the packet from virtual network device 202 (as opposed to receiving one copy from each network device 126(1) and 126(2) included in virtual network device 202) and the appearance of virtual network device 202 being a single entity is maintained.

Figure 3B:
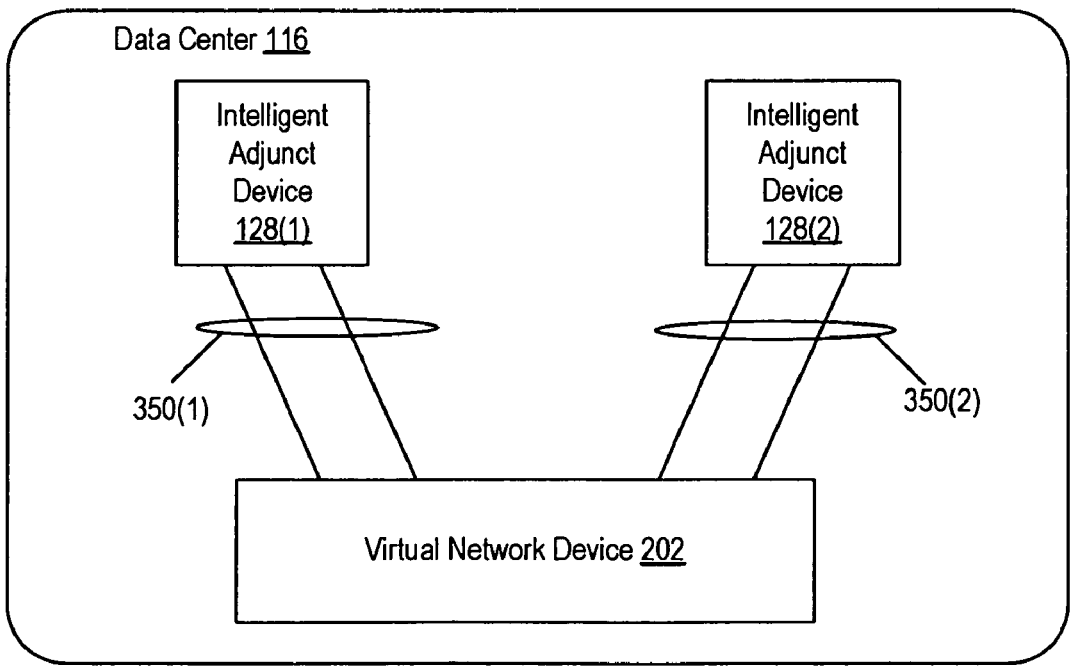

Intelligent adjunct network devices 128(1)-128(n) can interact with virtual network device 202 in the same way as the intelligent adjunct network devices would interact with a single physical device. Thus, for the purposes of routing protocols such as spanning tree, each intelligent adjunct network device is coupled to a single device, virtual network device 202, as shown in FIG. 3B. In embodiments, such as the one shown in FIG. 3B, in which intelligent adjunct network devices 128(1) and 128(2) operate as if the intelligent adjunct network devices are connected to a single network device, the use of virtual link bundles 350(1) and 350(2) is simplified. For example, if intelligent adjunct network device 128(1) is aware that virtual link bundle 350(1) terminates at two different network devices, intelligent adjunct network device 128(1) may select a link on which to send a particular packet based on Spanning Tree Protocol. The use of Spanning Tree Protocol may involve more overhead and/or be more restrictive with respect to which links can be used to send a given packet (e.g., Spanning Tree Protocol might block all but one of the links, preventing utilization of all but one non-blocked link) than if intelligent adjunct network device 128(1) simply views virtual network device 202 as a single entity. When viewing virtual network device 202 as a single entity, for example, intelligent adjunct network device 128(1) can simply select a link on which to send a packet based on load-sharing constraints. Similarly, if a link within virtual link bundle 350(1) fails, there is no need for intelligent adjunct network device 128(1) to change how Spanning Tree Protocol is applied. Instead, intelligent adjunct network device 128(1) can simply continue to use the non-failed links within virtual link bundle 350(1).

Figure 3C:
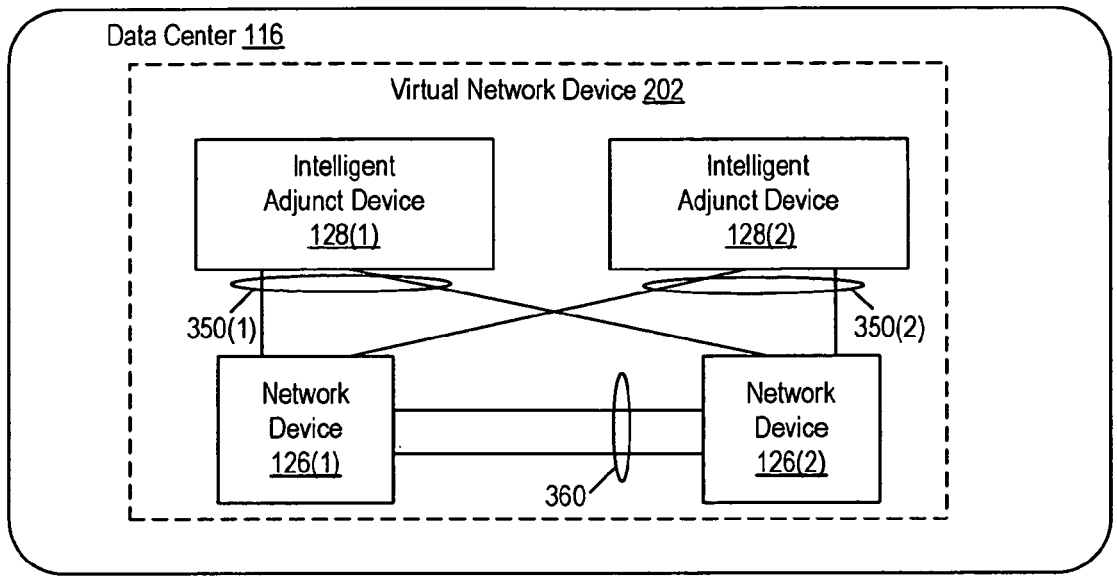

FIG. 3C shows the manner in which virtual network device 202 can effectively include both network devices 126(1) and 126(2) and intelligent adjunct network devices 128(1) and 128(2), in the case where network devices 126(1) and 126(2) coordinate with each other in order to operate as a virtual network device and each intelligent adjunct network device 128(1) and 128(2) is operated as a virtual line card of network devices 126(1) and 126(2). When operated in this way, management of each aspect of virtual network device 202 can be centralized in one of network devices 126(1) and 126(2). In some embodiments, each network device 126(1) and 126(2) controls a unique aspect of virtual network device 202. For example, network device 126(1) can manage routing protocols for interfaces connected via virtual link bundle 350(1) while network device 126(2) manages routing protocols for interfaces connected via virtual link bundle 350(2). In other embodiments, all of the aspects of virtual network device 202 are controlled by the same network device 126(1) or 126(2).

By centralizing management of virtual network device 202, user management of virtual network device 202 can be simplified. For example, if configuration information needs to be updated, a service person can manually upgrade the configuration information on network device 126(1), which is currently controlling virtual network device 202. Network device 126(1) can then automatically distribute the updated information to network device 126(2), and network devices 126(1) and 126(2) can likewise automatically distribute the information to intelligent adjunct network devices 128(1) and 128(2).

Figure 4:
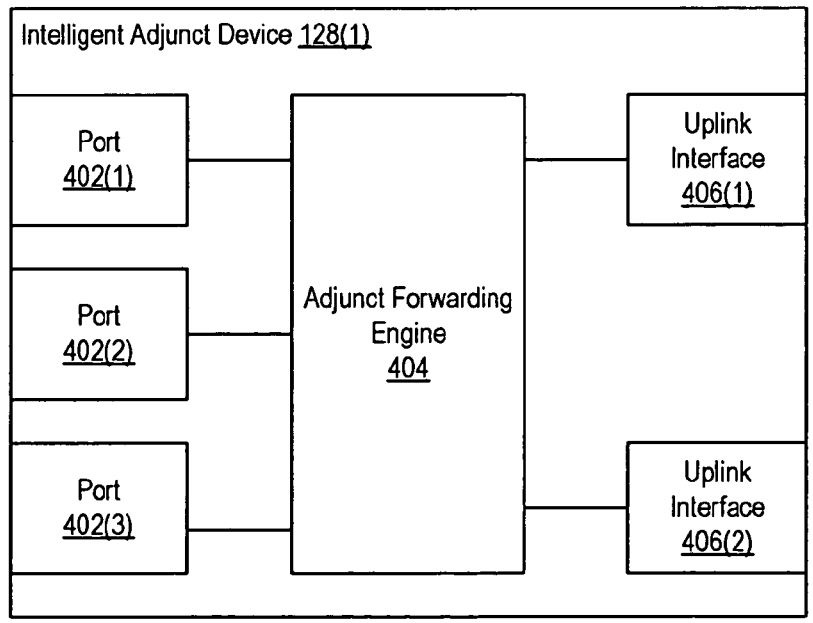
FIG. 4 is a block diagram of an intelligent adjunct network device, according to one embodiment of the present invention.

FIG. 4 is a block diagram of an intelligent adjunct network device. As shown, intelligent adjunct network device 128(1) can include several ports 402(1)-402(3), adjunct forwarding engine 404, and several uplink interfaces 406(1)-406(2). It is noted that fewer or additional ports, adjunct forwarding engines, and/or uplink interfaces can be included in other embodiments. For example, in one embodiment, intelligent adjunct network device includes several line cards, each of which can include its own ports, adjunct forwarding engine, and/or uplink interfaces. It is also noted that the physical arrangement of and/or interconnections between components of intelligent adjunct device 128(2) can vary from the logical representation shown in FIG. 4 (e.g., ports 402(1)-402(3) and uplink interfaces 406(1)-406(2) can be coupled to adjunct forwarding engine 404 by an internal bus, in some embodiments).

Ports 402(1)-402(3) are configured to be coupled to devices, such as servers 104(1)-104(n), that are to be interconnected by a network. Ports 402(1)-402(3) can provide ingress, egress, and/or ingress and egress functionality in order to send packets to and/or receive packets from these devices. Ports 402(1)-402(3) are viewed as local to a controlling virtual network device 202 (or to a controlling network device 126(1) or 126(2) in embodiments that do not implement virtual network devices) that controls intelligent adjunct network device 128(1). Uplink interfaces 406(1)-406(2) are configured to be coupled to uplinks to a controlling network device. In this example, uplink interfaces 406(1) and 406(2) are each coupled to a respective link within virtual link bundle 350(1) of FIGS. 3A-3C. Adjunct forwarding engine 404 performs decision-making with respect to how packets received by intelligent adjunct network device 128(1) are conveyed through the network.

When a packet is sent via one of uplink interfaces 406(1)-406(2), a header is appended to the packet. The header can include information identifying which of ports 402(1)-402(3) originally received the packet. The header can also include the result of a lookup performed by adjunct forwarding engine 404 (e.g., if adjunct forwarding engine 404 could not find a match for the packet's destination address in a lookup table, the header can indicate that the result of the lookup is that the packet is being flooded by intelligent adjunct network device 128(1)). This header can be appended to the packet by a controller within the uplink interface 406(1) or 406(2) sending the packet or by a controller within adjunct forwarding engine 404.

When a packet is received via one of uplink interfaces 406(1)-406(2), the packet can also include a header, which has been generated by a controlling network device 126(1) or 126(2) or by another intelligent adjunct network device (e.g., intelligent adjunct network device 128(2)). This header can include information identifying what forwarding and/or routing has been performed for the packet and/or the result of such forwarding and/or routing. For example, consider a packet and header received from network device 126(1). If network device 126(1) performed a lookup for the packet's destination address in a lookup table and determined that port 402(2) is the appropriate destination for the packet, the header can include information identifying port 402(2). If instead network device 126(1) could not find a match for the destination address in a lookup table, network device 126(1) can flood the packet. In that situation, the header appended to the packet can indicate that the packet should be flooded.

In some embodiments, adjunct forwarding engine 404 is capable of performing only a subset of the tasks performed by a forwarding engine in a non-adjunct device. For example, the forwarding engines included in network devices 126(1) and 126(2) forward packets and actively participate in various Layer 3 (L3) routing and Layer 2 (L2) control protocols. In contrast, adjunct forwarding engine 404 can forward packets but may not actively participate in all (or any) the various L3 routing and/or L2 control protocols. In such embodiments, adjunct forwarding engine 404 is configured to download L3 routing information and/or L2 control information from the network device (e.g., virtual network device 202) that controls intelligent adjunct network device 128(1). For example, adjunct forwarding engine 404 can receive one or more packets via uplink interfaces 406(1) and/or 406(2) that include L3 routing information generated by network devices 126(1) and/or 126(2). Adjunct forwarding engine 404 stores this information locally and uses the stored information to perform L3 routing for packets received via ports 402(1)-403(3). In embodiments where adjunct forwarding engine 404 is capable of performing only a subset of the forwarding and/or routing tasks, adjunct forwarding engine 404 can be implemented using less complex and/or less expensive hardware than would be necessary to implement the full set of forwarding and/or routing tasks.

Adjunct forwarding engine 404 performs its own Layer 2 (L2) learning and forwarding. For example, if a packet is received from a device having MAC (Media Access Control) address A via port 402(1), adjunct forwarding engine 404 can "learn" that MAC address A is behind port 402(1) by associating MAC address A with port 402(1). Adjunct forwarding engine 404 can associate MAC address A with port 402(1) by allocating a lookup table entry to MAC address A and storing information identifying port 402(2) in that entry. If a packet is later received via another port or via an uplink interface and that packet specifies MAC address A as its destination, adjunct forwarding engine 404 will send the packet to port 402(1).

When adjunct forwarding engine 404 cannot forward a packet locally, adjunct forwarding engine 404 causes the packet to be sent to a controlling network device via an uplink (e.g., by sending the packet to the uplink interface coupled to the appropriate uplink). Thus, if the packet's destination address does not correspond to one of ports 402(1)-402(3)), or if adjunct forwarding engine 404 does not know the location of the packet's destination address, adjunct forwarding engine 404 can cause the packet to be sent to one of uplink interfaces 406(1) and 406(2). For example, if the destination interface is on a different intelligent adjunct device or on a local port of one of the controlling network devices 126(1) and 126(2), adjunct forwarding engine 404 will select one of uplink interfaces 406(1) and 406(2). Similarly, if the packet has a multicast destination address and if any of the devices in the multicast group identified by that address are not attached locally to intelligent adjunct network device 128(1), adjunct forwarding engine 404 can cause the packet to be sent to each port corresponding to the multicast group as well as to one of uplink interfaces 406(1) and 406(2).

Adjunct forwarding engine 404 can also maintain consistency between locally generated forwarding information and forwarding information maintained by a controlling network device. For example, assume intelligent adjunct network device 128(1) receives a packet and header via one of uplink interfaces 406(1) and 406(2). Forwarding information included in the header is inconsistent with forwarding information maintained by adjunct forwarding engine 404. In response to detecting the inconsistency, intelligent adjunct network device 128(1) causes an error notification to be sent back to the sending network device (e.g., by sending the error notification to the appropriate uplink interface). This error notification can indicate that an inconsistency has been detected and can identify the particular information that is inconsistent. In some embodiments, the error notification can also include the correct value of the information.

As an example, consider a situation in which a device connected to port 402(2) is removed and reattached on port 402(1). Intelligent adjunct network device 128(1) has detected this change, but other network devices (e.g., controlling network devices 126(1) and/or 126(2)) have not yet updated local forwarding information to reflect the change. Intelligent adjunct network device 128(1) receives a packet via uplink interface 406(1). The header of this packet indicates that port 402(2) is the destination of the packet, but forwarding information maintained by adjunct forwarding engine 404 indicates that port 402(1) is the correct destination. In response to this inconsistency, adjunct forwarding engine 404 causes an error notification to be sent to the sending device. This error notification includes, for example, the packet's destination address and the logical identifier of port 402(1). In a similar example, if a packet is received via an uplink interface and the packet's header indicates that the packet is being flooded, and if adjunct forwarding engine 404 knows that the location of the packet's destination address is behind port 402(3), an error notification is sent. This error notification includes, for example, the logical identifier of port 402(3) and the packet's destination address.

In some embodiments, packets received via uplink interfaces 406(1) and 406(2) have headers indicating that routing has already been performed for those packets. In such a situation, no additional routing is performed for those packets by intelligent adjunct network device 128(1).

It is noted that if intelligent adjunct network device 128(1) has already forwarded a packet via any local ports 402(1)-402(3), intelligent adjunct network device 128(1) should not later forward another copy of that packet via any of its local ports. For example, assume intelligent adjunct network device 128(1) floods a packet on each outgoing port (excluding the port via which the packet was originally received) and sends a copy of the packet and an appropriate header via uplink interface 406(1). Assuming uplink interface 406(1) is coupled to network device 126(1), network device 126(1) receives the packet and the header. Network device 126(1) also floods the packet, such that a copy of the packet is sent to any devices locally attached to network device 126(1), to intelligent adjunct network device 128(2) via virtual link bundle 350(2), and to network device 126(2) via virtual network device link 360 (as shown in FIG. 3A). When network device 126(2) receives the packet, it updates a value in the header to indicate that the packet was received from network device 126(1) (alternatively, network device 126(1) can update this value). If network device 126(2) also floods the packet, network device 126(2) will prevent any copy of the packet from being sent via virtual link bundles 350(1) and 350(2), since network device 126(1) has already sent a copy of the packet on those virtual link bundles, if necessary. Accordingly, network devices within a virtual network device 202 can coordinate in order to prevent packets received from a particular intelligent adjunct network device from being sent back to that particular intelligent adjunct network device.

Figure 5:
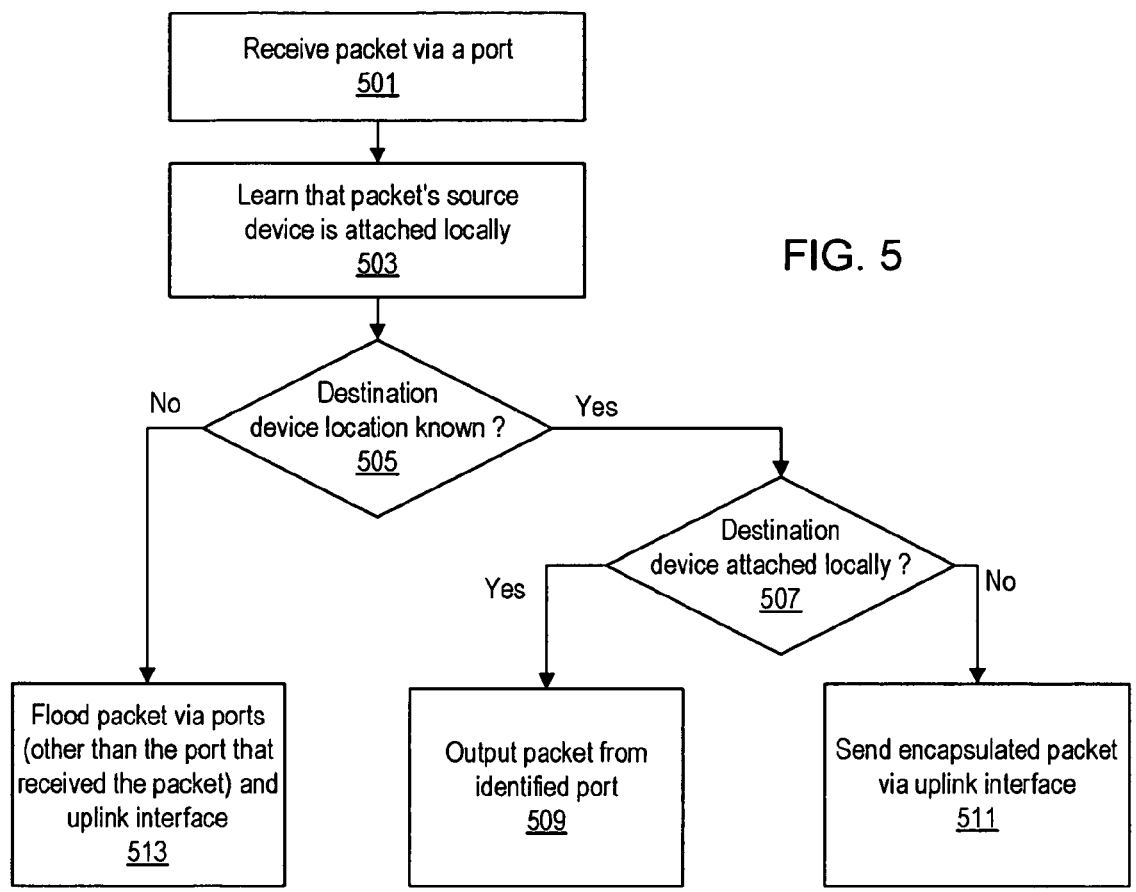
FIG. 5 is a flowchart showing the manner in which an intelligent adjunct network device can perform local forwarding, according to one embodiment of the present invention.

FIG. 5 is a flowchart showing the manner in which an intelligent adjunct network device can perform local forwarding. As shown at 501, a packet is received via a port of an intelligent adjunct network device. For example, the packet is received from a server connected to that port via an Ethernet link. In response to receiving the packet, the intelligent adjunct network device learns that the packet's source address is attached locally, as shown at 503. Thus, the intelligent adjunct network device can learn that the location of the sending device is behind the port via which the packet is received (at 501). The intelligent adjunct network device can learn the location by, for example, allocating an entry in a lookup table. The entry can include the packet's source MAC address and the logical identifier of the port via which the packet was received.

At 505, the intelligent adjunct network device determines whether the intelligent adjunct network device knows the location of the destination device to which the packet is addressed. For example, the intelligent adjunct network device can input the packet's destination address to a lookup table. If a matching entry is found in the lookup table, the intelligent adjunct network device knows the location of the packet's destination device. If no matching entry is found (e.g., if the destination address misses in the lookup table), the intelligent adjunct network device does not know the location of the packet's destination device.

If the location of the destination device is known, the intelligent adjunct network device determines whether all of the packet's destination device(s) are attached locally, as shown at 507. For example, if the packet is a unicast packet, the intelligent adjunct network device can look up the packet's destination address in a lookup table. If a matching entry for the destination address is found in the lookup table, and if the matching entry identifies a local port of the intelligent adjunct device, the intelligent adjunct network device can output the packet from the identified port, as shown at 509. If instead the matching entry identifies a port on a controlling network device (e.g., within a virtual network device) or on another intelligent adjunct network device, the intelligent adjunct network device encapsulates the packet with a header and sends the packet to a controlling network device via an uplink interface, as shown at 511. The header includes the result of the lookup and/or information identifying the port via which the packet was received (at 501).

In general, if any of the packet's destination devices are not attached locally, the intelligent adjunct network device encapsulates the packet and sends the encapsulated packet via the uplink interface, as shown at 511. If there are multiple uplinks coupling the intelligent adjunct network device to a controlling device (e.g., a virtual network device as shown in FIGS. 3A-3C), the intelligent adjunct network device selects a single one of the uplinks via which to send the encapsulated packet. If some of the packet's destination devices are also attached locally, the intelligent adjunct network device can also send a copy of that packet to each locally attached destination device. For example, assume the packet's destination address is a multicast destination address that identifies a multicast group having three member devices. Two of the devices within the multicast group are attached locally to the intelligent adjunct network device, but the remaining device is not. In this situation, the intelligent adjunct network device sends a copy of the packet to each of the locally attached devices in the multicast group. The intelligent adjunct network device also sends an encapsulated copy of the packet via the uplink interface for forwarding to the final device in the multicast group.

If the intelligent adjunct network device does not know whether the destination device is attached locally (e.g., if the packet's destination address misses in a lookup table), the intelligent adjunct network device floods the packet, as shown at 513. When the packet is flooded, the intelligent adjunct network device sends a copy of the packet via each local port (other than the port via which the packet was received at 501). It is noted that in embodiments implementing VLANs (Virtual Local Area Networks), the packet is only flooded to ports in the same VLAN as that port that received the packet. The intelligent adjunct network device also sends an encapsulated copy of the packet via one of the uplinks.

Figure 6:
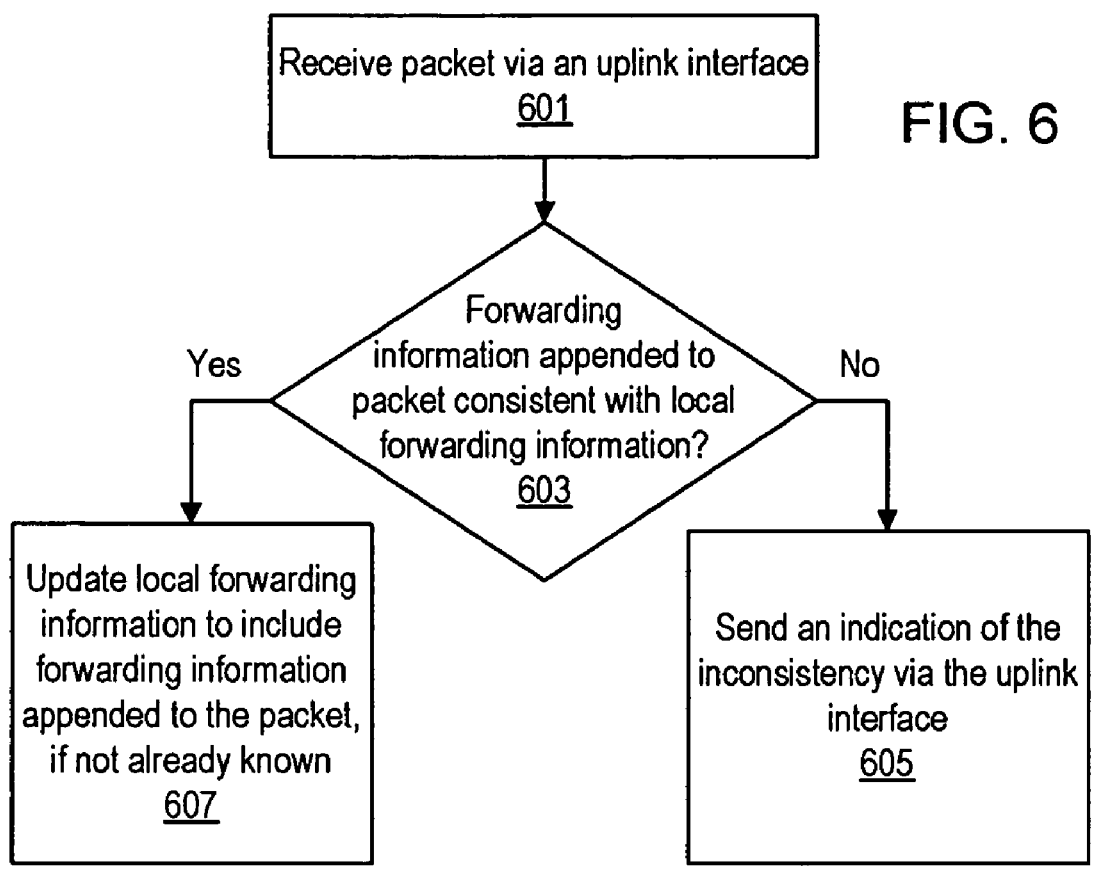
FIG. 6 is a flowchart illustrating the manner in which an intelligent adjunct network device can receive forwarding information via an uplink interface, according to one embodiment of the present invention.

FIG. 6 is a flowchart illustrating the manner in which an intelligent adjunct network device can receive forwarding information via an uplink interface. At 601, the intelligent adjunct network device receives an encapsulated packet via an uplink interface. The packet is encapsulated with a header that includes forwarding information (e.g., such as a port identifier obtained by accessing a lookup table).

At 603, the intelligent adjunct network device determines whether the forwarding information appended to the packet is consistent with local forwarding information maintained by the intelligent adjunct network device. For example, the intelligent adjunct network device can provide the packet's destination address to a lookup table. If a matching entry is found, the intelligent adjunct network device can compare the information included in the matching entry to the information included in the packet's header. If the information is not consistent (e.g., if the header identifies a different port than the matching forwarding table entry identifies), the intelligent adjunct network device sends an indication of the inconsistency via the uplink interface, as shown at 605. The uplink interface via which this indication is sent can be the same uplink interface that received the packet (at 601), or another uplink interface within the same interface bundle as the uplink interface that received the packet.

The indication of the inconsistency can include information identifying which information is inconsistent. For example, the indication can include the destination address of the packet. The indication of the inconsistency can also include the correct value of the forwarding information. For example, if the intelligent adjunct network device has learned that the destination device is behind a local port, but the header received via the uplink interface indicates that the packet is being flooded, the intelligent adjunct network device can include the packet's destination address and the port identifier of the local port in the indication of the inconsistency. The indication of the inconsistency is a MAC notification in some embodiments.

If the information is consistent (e.g., if the information is the same), the intelligent adjunct network device does not need to send an indication of the inconsistency via the uplink. Additionally, if the intelligent adjunct network device does not already know the location of the packet's destination, but the header appended to the packet identifies the location, the intelligent adjunct network device can update its local forwarding information to include the forwarding information appended to the packet, as shown at 607.

Figure 7:
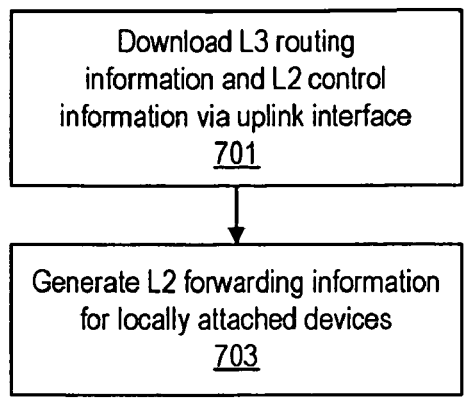
FIG. 7 illustrates a method of configuring an intelligent adjunct network device with L2 and L3 information, according to one embodiment of the present invention.

FIG. 7 illustrates a method of configuring an intelligent adjunct network device with L2 control information and L3 routing information. As shown, at 701, the intelligent adjunct network device downloads L3 routing information (e.g., in the form of one or more forwarding tables) and L2 control protocol information via an uplink interface. This download can be initiated by the intelligent adjunct network device (e.g., upon being powered on or upon the detection of a possible inconsistency) or by the controlling network device (e.g., periodically or in response to the controlling network device updating its copy of the information). The intelligent adjunct network device can then use the downloaded information to perform local forwarding.

At 703, the intelligent adjunct network device generates L2 forwarding information for locally attached devices. For example, in response to receiving a packet from a locally attached server, the intelligent adjunct network device learns that the server is located behind a local port. Intelligent adjunct network device then uses this information to forward packets. Thus, the intelligent adjunct network device can forward packets based on both locally generated forwarding information and based on forwarding information downloaded from a controlling network device.

Figure 8:
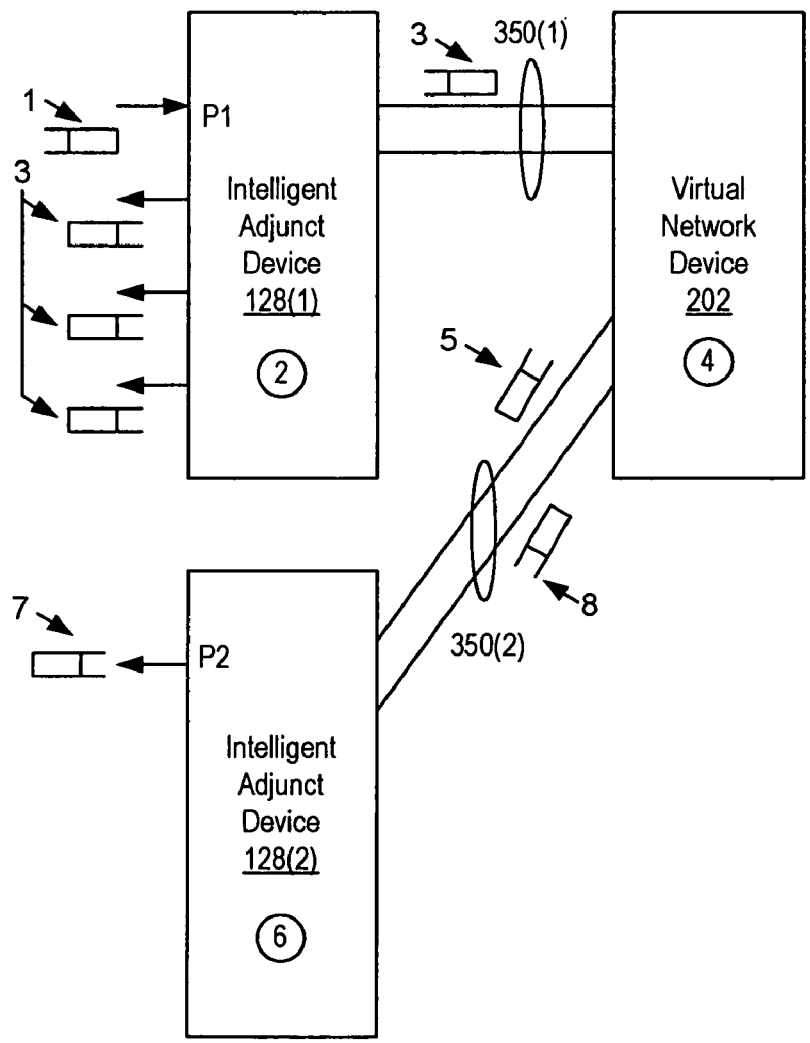
FIG. 8 shows how an intelligent adjunct network device can forward a packet, according to one embodiment of the present invention.

FIG. 8 shows how an intelligent adjunct network device can forward a packet, according to one embodiment of the present invention. Here, two intelligent adjunct network devices 128(1) and 128(2) are coupled to virtual network device 202. Intelligent adjunct network device 128(1) is coupled to virtual network device 202 by virtual link bundle 350(1) and intelligent adjunct network device 128(2) is coupled to virtual network device 202 by virtual link bundle 350(2). Both intelligent adjunct network device 128(1) and intelligent adjunct network device 128(2) can be operated as virtual line cards of virtual network device 202, as described above. As such, virtual network device 202 can perform routing and forwarding for the intelligent adjunct network devices. Virtual network device 202 can also be configured to perform control protocol processing for the intelligent adjunct network devices.

In this example, steps 1-8 are illustrated. In step 1, intelligent adjunct network device 128(1) receives a packet from a locally attached device via port P1. Intelligent adjunct network device determines whether the packet can be forwarded locally in step 2. For example, intelligent adjunct network device 128(1) looks up the packet's destination address in a forwarding table.

In this example, intelligent adjunct network device 128(1) does not know the location of the packet's destination device (e.g., there is a forwarding table miss for the packet's destination address). As a result, intelligent adjunct network device 128(1) floods the packet, as shown in step 3. When the packet is flooded, a copy of the packet is output from each port other than P1. Another copy of the packet is output via one of the uplinks included in virtual link bundle 350(1).

Virtual network device 202 receives the copy of the packet sent via virtual link bundle 350(1). In step 4, virtual network device 202 determines how to forward the packet. Here, virtual network device 202 also does not know the location of the packet's destination, so virtual network device 202 floods the packet, as shown in step 5. When flooding the packet, virtual network device 202 selects one of the uplinks in virtual link bundle 350(2) on which to send a copy of the packet to intelligent adjunct network device 128(2). This copy of the packet is encapsulated with a header that indicates that the packet is being flooded. In this example, since the packet was received via virtual link bundle 350(1), virtual network device 202 does not send another copy of the packet to intelligent adjunct network device 128(1) when flooding the packet.

Intelligent adjunct network device 128(2) receives the encapsulated packet via virtual link bundle 350(2). In step 6, intelligent adjunct network device 128(2) determines whether the forwarding information in the header is consistent with local forwarding information generated by intelligent adjunct network device 128(2). In this example, intelligent adjunct network device 128(2) knows that the packet's destination address is located behind port P2. Accordingly, intelligent adjunct network device 128(2) outputs the packet via port P2, as shown in step 7.

Intelligent adjunct network device 128(2) also outputs an error notification via one of the uplinks in virtual link bundle 350(2), as shown in step 8, due to the inconsistency between the forwarding information in the header and the local forwarding information. This error notification can include the packet's destination address and the logical identifier of port P2. In response to receiving the error notification, virtual network device 202 can learn the location of the destination device. Accordingly, subsequent packets addressed to the destination device will not be flooded by virtual network device 202. Virtual network device can also forward the error notification to intelligent adjunct network device 128(1) so that intelligent adjunct network device 128(1) will no longer flood packets being sent to that destination device.

It is noted that in some embodiments, some of the functionality needed to implement an intelligent adjunct network device, which performs local forwarding and/or routing while also being controlled by another network device, is implemented in software executing on the intelligent adjunct network device. For example, each intelligent adjunct network device can include a computer readable media upon which program instructions and/or data, useable to perform one or more of the methods shown in FIGS. 5, 6, and 7, are stored. Such program instructions are executable to detect the reception of packets, which are received by the adjunct network device via an interface. Exemplary types of computer readable media include CDs (Compact Discs), DVDs (Digital Versatile Discs), hard disks, optical disks, tape devices, floppy disks, and memory (e.g., various types of RAM (Random Access Memory), ROM (Read Only Memory), flash memory, MEMS (Micro Electro-Mechanical Systems) memory, and the like). Such a network device can include one or more processors (e.g., microprocessors, PLDs (Programmable Logic Devices), or ASICs (Application Specific Integrated Circuits)) configured to execute program instructions stored in the computer readable media. The program instructions and/or data can also be transferred to an intelligent adjunct network device via a network such as the Internet or upon a carrier medium. In some embodiments, a computer readable medium is a carrier medium such as a network and/or a wireless link upon which signals such as electrical, electromagnetic, or digital signals, on which the data and instructions are encoded, are conveyed.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Although the present invention has been described with respect to specific embodiments thereof, various changes and modifications may be suggested to one skilled in the art. It is intended such changes and modifications fall within the scope of the appended claims.

What is claimed is:

1. A method comprising:
    receiving first forwarding information via an uplink interface;
    storing the first forwarding information in a local forwarding table;
    receiving a packet via a first port of a plurality of ports, wherein
        the packet comprises a destination address, and
        the uplink interface is different from the plurality of ports;
    determining whether the destination address corresponds to any of the plurality of ports, wherein the determining is based, at least in part, on the local forwarding table;
    in response to determining the destination address does not correspond to any of the plurality of ports, based at least in part on the local forwarding table, sending the packet and additional information associated with the packet to the uplink interface;
    receiving second forwarding information via the uplink interface, wherein the second forwarding information comprises results of a table lookup;
    comparing the second forwarding information with forwarding information stored in the local forwarding table; and
    sending an error notification to the uplink interface in response to detecting a conflict between the forwarding information stored in the local forwarding table and the second forwarding information.

2. The method of claim 1, further comprising:
    if the destination address corresponds to one of the ports, sending the packet to the one of the ports.

3. The method of claim 1, wherein the error notification comprises information, the information indicating a correct value of the forwarding information.

4. The method of claim 1, further comprising:
    downloading routing information to a forwarding engine via the uplink interface.

5. The method of claim 1, further comprising:
    receiving a second packet via the first port, the second packet comprising a multicast destination address; and
    sending a copy of the second packet to one or more of the ports.

6. The method of claim 5, further comprising:
    sending an additional copy of the second packet to the uplink interface.

7. The method of claim 1, further comprising:
    receiving a second packet via the first port, the second packet comprising an unknown destination address; and
    flooding the second packet, wherein the flooding comprises:
        sending a copy of the second packet to the uplink interface and to one or more of the ports.

8. A method comprising:
    receiving first forwarding information via an uplink interface wherein the uplink interface is coupled to a virtual link bundle;
    storing the first forwarding information in a local forwarding table;
    receiving a packet via a first port of a plurality of ports, wherein
        the packet comprises a destination address, and
        the uplink interface is different from the plurality of ports;
    determining whether the destination address corresponds to any of the plurality of ports, wherein the determining is based, at least in part, on the local forwarding table;
    in response to determining the destination address does not correspond to any of the plurality of ports, based at least in part on the local forwarding table, sending the packet and additional information associated with the packet to the uplink interface, wherein
        the additional information identifies the first port;
    receiving the packet sent via the uplink interface at a virtual network device; and
    preventing the packet from subsequently being sent from the virtual network device via the virtual link bundle.

9. The method of claim 8, wherein
    the additional information comprises a destination identifier generated by performing a lookup for the destination address.

10. A system comprising:
    a plurality of ports, wherein a first port of the ports is configured to receive a packet comprising a destination address;
    an uplink interface, wherein
        the uplink interface is different from the plurality of ports; and
    an adjunct forwarding engine coupled to the ports and the uplink interface, wherein the adjunct forwarding engine is configured to:
        receive first forwarding information via the uplink interface;
        store the first forwarding information in a local forwarding table;
        determine whether the destination address is associated with any of the plurality of ports, wherein the determining is based, at least in part, on the local forwarding table;
        send the packet and additional information associated with the packet to the uplink interface in response to determining the destination address is not associated with any of the ports;
        receive second forwarding information via the uplink interface, wherein the second forwarding information comprises results of a table lookup;

compare the second forwarding information with forwarding information stored in the local forwarding table; and send an error notification to the uplink interface in response to detecting a conflict between the forwarding information stored in the local forwarding table and the second forwarding information.

11. The system of claim 10, wherein
the packet is sent to one of the ports if the destination address is associated with the one of the ports.

12. The system of claim 10, further comprising:
a controller configured to append a header to the packet before the packet is sent to the uplink interface, wherein the header comprises information identifying the first port.

13. The system of claim 12, wherein the header comprises a destination identifier generated by performing a lookup for the destination address.

14. The system of claim 10, wherein
the error notification comprises information, the information indicating a correct value of the forwarding information.

15. The system of claim 10, wherein
the adjunct forwarding engine is configured to download forwarding information via the uplink.

16. The system of claim 10, wherein
the additional information identifies the first port.

17. The system of claim 16, wherein the additional information comprises a destination identifier generated by performing a lookup for the destination address.

18. The system of claim 16, further comprising:
an uplink coupled to the uplink interface, wherein the uplink is comprised in a virtual link bundle.

19. The system of claim 10, wherein
the destination address comprises a multicast destination address; and
the adjunct forwarding engine is configured to send a copy of the packet to one or more of the ports.

20. The system of claim 19, wherein
the adjunct forwarding engine is configured to send an additional copy of the packet via the uplink interface.

21. The system of claim 10, wherein
the adjunct forwarding engine is configured to flood the packet, wherein flooding the packet comprises:
sending a copy of the packet to each of the uplink interface and one or more of the ports.

22. A system comprising:
a plurality of ports, wherein a first port of the ports is configured to receive a packet comprising a destination address;
an uplink interface, wherein
the uplink interface is different from the plurality of ports;
an adjunct forwarding engine coupled to the ports and the uplink interface, wherein the adjunct forwarding engine is configured to:
receive first forwarding information via the uplink interface;
store the first forwarding information in a local forwarding table;
determine whether the destination address is associated with any of the plurality of ports, wherein the determining is based, at least in part, on the local forwarding table; and
send the packet and additional information associated with the packet to the uplink interface in response to determining the destination address is not associated with any of the ports
an uplink coupled to the uplink interface, wherein the uplink is comprised in a virtual link bundle; and
a virtual network device coupled to the virtual link bundle, wherein
the virtual network device is configured to receive the packet via the uplink; and
the virtual network device is configured to prevent the packet from subsequently being sent via the virtual link bundle.

* * * * *